March 26, 1968     K. F. FERGUSON     3,374,775

DIESEL ENGINE INTAKE AND EXHAUST SYSTEM

Filed Feb. 14, 1966     2 Sheets-Sheet 1

INVENTOR
KENNETH F. FERGUSON

BY HIS ATTORNEYS
HARRIS, KIECH, RUSSELL & KERN

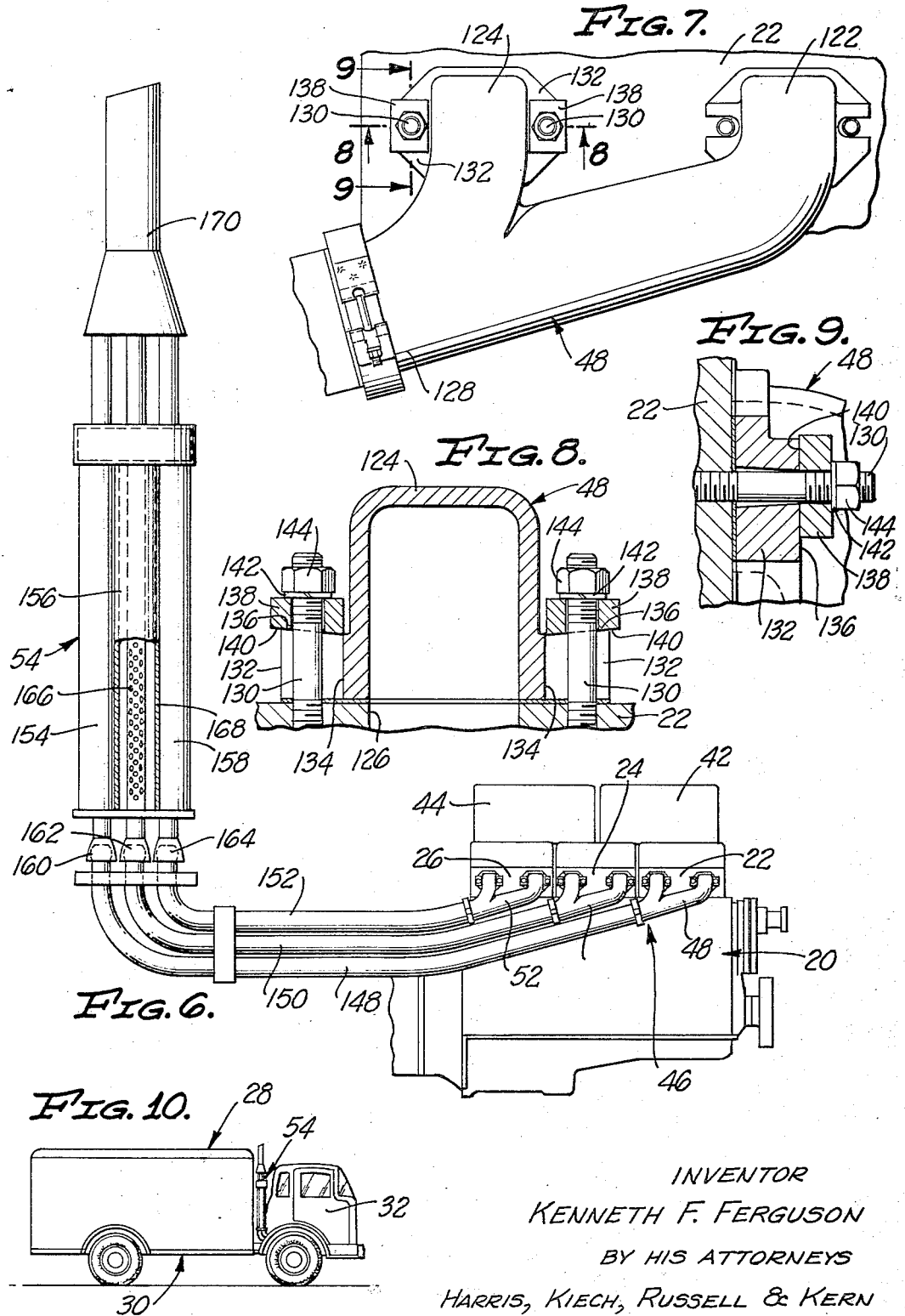

United States Patent Office 3,374,775
Patented Mar. 26, 1968

3,374,775
DIESEL ENGINE INTAKE AND
EXHAUST SYSTEM
Kenneth F. Ferguson, Placentia, Calif., assignor to Hunt Foods and Industries, Inc., Fullerton, Calif., a corporation of Delaware
Filed Feb. 14, 1966, Ser. No. 527,119
6 Claims. (Cl. 123—52)

ABSTRACT OF THE DISCLOSURE

A piston engine intake and exhaust system having separate intake and exhaust manifolds for each pair of cylinders, together with a separate muffler for each exhaust manifold. Each pair of cylinders is provided with a Y-shaped intake passage which includes a common inlet portion terminating in branch outlet portions respectively leading to the cylinders. Each intake manifold is provided with a Y-shaped intake-manifold passage which includes branch inlet portions merging into a common outlet portion communicating with the inlet portion of the intake passage leading to the corresponding cylinders. The branch outlet portions of each intake passage and the branch inlet portions of the corresponding intake-manifold passage are arranged in a generally X-shaped pattern, thereby resulting in diagonal air delivery to the intake valves of the cylinders.

Background of invention

The present invention relates in general to intake and exhaust systems for piston-type internal combustion engines, and a primary object of the invention is to minimize flow losses through such an engine to improve its performance in various respects.

Since the invention was originally embodied in and is particularly applicable to an in-line diesel engine, it will be considered in connection with an engine of this type herein for convenience. However, it will be understood that various aspects of the invention may be applicable to internal combustion piston engines of other types.

The invention contemplates air intake and exhaust systems, particularly for in-line diesel engines, capable of reducing the vacuum on the intake side of the engine to a few inches of water, e.g., to of the order of three inches of water, and capable of reducing the back pressure on the exhaust side to a value of the order of one inch of water, or less. With such low negative and positive pressures on the intake and exhaust sides of the engine, flow losses through the engine are reduced virtually to an absolute minimum. The end result is improved engine performance in numerous respects, examples being increased efficiency, i.e., increased power output and decreased fuel consumption, smoother operation at idling and operating speeds, more uniform torque output at different operating speeds, lower exhaust temperatures under peak loads, lower lubricating oil temperatures, and the like, which are important features of the invention.

Summary and objects of invention

Considering the invention more specifically, a basic object thereof is to group the cylinders of the engine in pairs and to provide separate intake manifolds and separate exhaust manifolds for the respective pairs of cylinders, instead of a common intake manifold and a common exhaust manifold for all of the cylinders. A related object is to pair off cylinders which are separated in the firing order of the engine so that both cylinders of each pair do not draw air from their intake manifold, or discharge products of combustion into their exhaust manifold, simultaneously. Normally, this effect can be achieved by pairing off adjacent cylinders since a typical in-line diesel-engine firing order is 1–5–3–6–2–4, or the like. With such a construction, providing pairs of adjacent cylinders with separate intake and exhaust manifolds minimizes flow losses through the engine since each manifold, whether intake or exhaust, is not required to serve more than one cylinder at any instant.

The invention contemplates an in-line diesel engine wherein each pair of cylinders is provided with a bifurcated, Y-shaped intake passage having a common inlet portion terminating in branch outlet portions leading to the respective cylinders of the pair. An extremely important object of the invention is to provide an air intake system comprising an intake manifold provided with a bifurcated, Y-shaped intake-manifold passage which includes branch inlet portions merging into a common outlet portion communicating with the inlet portion of the intake passage leading to the cylinders of the corresponding pair, the branch outlet portions of the intake passage leading to the cylinders and the branch inlet portions of the passage in the intake manifold being arranged in a generally X-shaped pattern.

With the foregoing air intake system, the respective cylinders of each pair draw air primarily from the diagonally opposite branch inlet portions of the passage in the intake manifold. Consequently, the air flowing to the intake valve or valves of each cylinder is delivered thereto along a path which makes an acute angle with the axis of the engine, instead of along a path perpendicular to such axis. In instances where each cylinder has two intake valves, the two are normally spaced apart along a line perpendicular to the axis of the engine. With the diagonal air delivery of the present invention, more air is delivered to the intake valve farthest from the intake manifold, i.e., the "rear" intake valve. The end result is that the rear intake valve runs cooler, and thus has a longer life, which is an important feature.

Another object is to provide an air intake manifold for each pair of cylinders wherein the outlet portion of the intake-manifold passage is generally horizontal and wherein the branch inlet portions of the intake-manifold passage are generally vertical and merge downwardly into the outlet portion of the intake-manifold passage.

Another object of the invention is to provide an exhaust manifold for each pair of cylinders provided with a bifurcated exhaust-manifold passage having branch inlet portions respectively communicating with the exhaust passages of the cylinders and having a common outlet portion communicating with the branch inlet portions thereof.

A further object is to provide an exhaust system which includes separate mufflers respectively connected to the exhaust manifolds.

Another object of the invention is to provide improved means for securing the exhaust manifolds to the engine which compensates for expansion and contraction of the various parts without any danger of breakage.

The foregoing objects, advantages, features and results of the present invention, together with various other objects, advantages, features and results thereof which will be evident to those skilled in the art in the light of this disclosure, may be achieved with the exemplary embodiments of the invention described in detail hereinafter and illustrated in the accompanying drawings.

Description of drawings

In the drawings.

FIG. 6 is a side view of the Cummins NH–250 six-cylinder in-line diesel engine, showing the side opposite that shown in FIG. 1, and showing an exhaust system of the invention installed on such engine;

FIG. 7 is an enlarged elevational view duplicating a portion of FIG. 6 and showing an exhaust manifold of the invention;

FIGS. 8 and 9 are enlarged, fragmentary sectional views respectively taken along the arrowed lines 8—8 and 9—9 of FIG. 7; and FIG. 10 is a side view, on a reduced scale, of a cab-over-engine truck in which the Cummins NH–250 diesel engine and the air intake and exhaust system of the invention are installed.

*Detailed description of preferred embodiments of invention*

Figure 1:
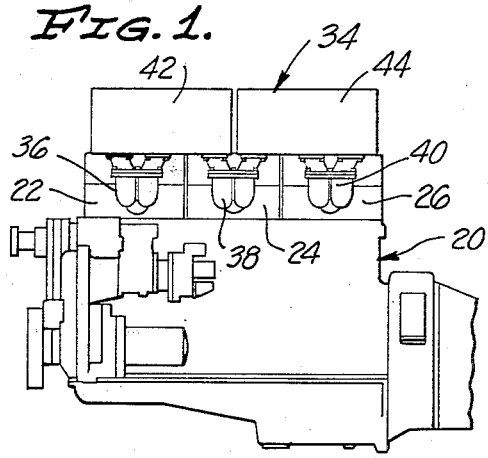
FIG. 1 is a side view of a Cummins NH–250 six-cylinder in-line diesel engine illustrating the air intake system of the invention installed on such engine.
Figure 2:
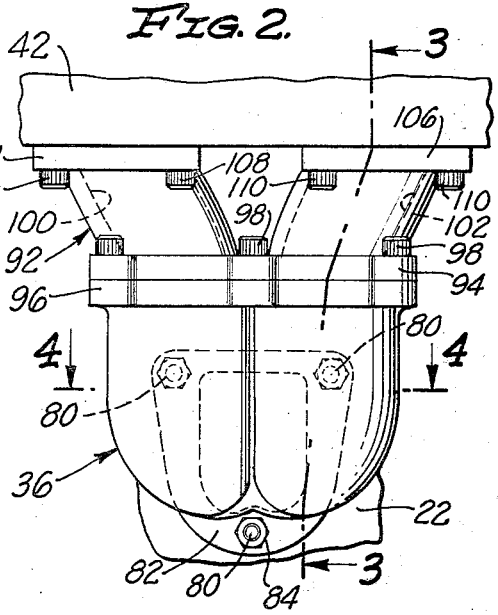
FIG. 2 is an enlarged elevational view duplicating a portion of FIG. 1 and illustrating an air intake manifold of the invention.
Figure 3:
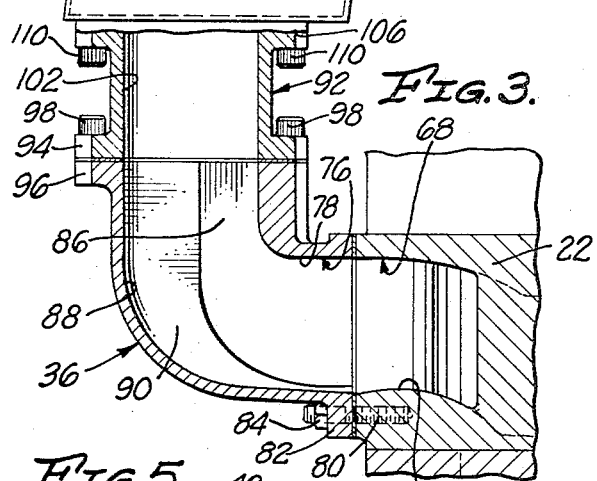
FIGS. 3 and 4 are sectional views respectively taken along the arrowed lines 3—3 and 4—4 of FIG. 2.

Referring initially to FIGS. 1 and 6 of the drawings, shown therein is a Cummins NH–250 six-cylinder in-line diesel engine 20 having front, intermediate and rear cylinder heads 22, 24 and 26 for the front, intermediate and rear pairs of cylinders. It will be understood that the No. 1 and No. 2 cylinders constitute the front pair, the No. 3 and No. 4 cylinders constitute the intermediate pair, and the No. 5 and No. 6 cylinders constitute the rear pair. FIG. 10 of the drawings shows the engine 20 installed in a cab-over-engine truck 28 which includes a chassis 30 and a cab 32. As is conventional in a truck of this type, the cab 32 is tiltable upwardly and forwardly for access to the engine 20. Although the engine 20 has been shown installed in the cab-over-engine truck 28, it will be understood that the invention is not limited to use in trucks of this type, or trucks of any other type for that matter.

As shown in FIG. 1, the invention comprises an air intake system 34 which includes separate front, intermediate and rear intake manifolds 36, 38 and 40 for the respective front, intermediate and rear pairs of cylinders. The front, intermediate and rear intake manifolds 36, 38 and 40 are mounted on the respective front, intermediate and rear cylinder heads 22, 24 and 26. The particular air intake system 34 shown includes front and rear dry air filters 42 and 44, the front filter being connected to the front and intermediate intake manifolds 36 and 38, and the rear filter being connected to the intermediate and rear intake manifolds 38 and 40. The air intake system 34 will be described in more detail hereinafter.

Referring to FIG. 6 of the drawings, illustrated therein is an exhaust system 46 of the invention which includes separate front, intermediate and rear exhaust manifolds for the respective front, intermediate and rear pairs of cylinders. The front, intermediate and rear exhaust manifolds 48, 50 and 52 are mounted on the front intermediate and rear cylinder heads 22, 24 and 26 and are connected to a muffler system 54 of the invention. The exhaust and muffler systems 46 and 54 will also be described in more detail hereinafter.

It will be apparent from the foregoing that the invention groups the cylinders of the engine 20 in pairs and provides separate intake manifolds and separate exhaust manifolds for the respective pairs of cylinders, instead of a common intake manifold and a common exhaust manifold for all of the cylinders. This basic arrangement greatly reduces the vacuum on the intake side of the engine and the back pressure on the exhaust side thereof. Consequently, flow losses through the engine are minimized, with resulting improvements in over-all engine performance, as hereinbefore outlined.

A typical firing order for the engine 20 is 1–5–3–6–2–4, so that the cylinders of each pair are separated in the firing order. This is essential to minimize flow losses through the engine 20 since each of the separate manifolds, whether intake or exhaust, serves only one cylinder at any instant.

Considering the air intake system 34 in more detail, the front, intermediate and rear intake manifolds 36, 38 and 40 are all identical, and have identical relationships to the corresponding pairs of cylinders, the corresponding cylinder heads 22, 24 and 26, and the filters 42 and 44. Consequently, only the front intake manifold 36, and its relationship to the front pair of cylinders, the front cylinder head 22, and the front filter 42, will be considered herein.

Figure 4:
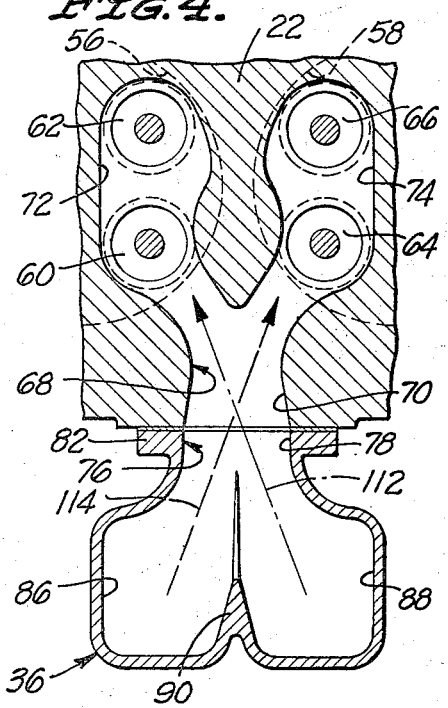

Turning to FIG. 4 of the drawings, which illustrates the front pair of cylinders fragmentarily, the No. 1 and No. 2 cylinders are respectively designated by the reference numerals 56 and 58. The cylinder 56 is provided with two intake valves 60 and 62 and the cylinder 58 is similarly provided with two intake valves 64 and 66. The intake valves 60 and 64 are closest to the corresponding intake manifold 36 and are commonly referred to as "front" intake valves. The intake valves 62 and 66 are spaced laterally from the front intake valves 60 and 64 along lines perpendicular to the axis of the engine 20, and are commonly referred to as "rear" intake valves.

The intake valves 60, 62, 64 and 66 are supplied with combustion air for the cylinders 56 and 58 through a bifurcated, Y-shaped intake passage 68 formed in the cylinder head 22. More particularly, the intake passage 68 includes an inlet portion 70 which extends inwardly from the intake side of the head 22 and which is common to both sets of intake valves. The common inlet portion 70 of the intake passage 68 terminates in branch outlet portions 72 and 74, the outlet portion 72 leading to the intake valves 60 and 62 controlling the flow of air to the cylinder 56, and the branch outlet portion 74 leading to the intake valves 64 and 66 controlling the flow of air to the cylinder 58.

The intake manifold 36 is also provided with a bifurcated, Y-shaped intake passage 76. The latter includes a generally horizontal outlet portion 78 which registers with and communicates with the inlet portion 70 of the intake passage 68 in the head 22. The intake manifold 36 is secured to the head 22, with the outlet portion 78 of the intake passage 76 in communication with the inlet portion 70 of the intake passage 68, by studs 80 threaded into the head and extending outwardly through holes in a flange 82 on the intake manifold. Nuts 84 are threaded on the studs 80 to secure the intake manifold 36.

The intake passage 76 in the intake manifold 36 also includes branch inlet portions 86 and 88 which are generally vertical, and which merge downwardly into the common outlet portion 78, the two inlet portions 86 and 88 being located in side-by-side relation in the direction of the axis of the engine 20. The two inlet portions 86 and 88 are at least partially separated by a partition 90 within the intake manifold 36 and sloping downwardly and laterally toward the cylinder head 22.

In the construction illustrated in FIGS. 1 to 4 of the drawings, the upper end of the intake manifold 36 is surmounted by a Y-shaped adapter 92 provided at its lower end with a flange 94 secured to a flange 96 at the upper end of the intake manifold 36 by bolts 98. The Y-shaped adapter 92 provides intake passages 100 and 102 which respectively constitute upward extensions of the branch inlet portions 86 and 88 of the intake passage 76 within the manifold 36. The Y-shaped adapter 92 is provided at its upper end with flanges 104 and 106 to which the filter 42 is secured by bolts 108 and 110, respectively. Thus, the air entering the intake passages 100 and 102 of the adapter 92 is cleaned by the filter 42.

Figure 5:
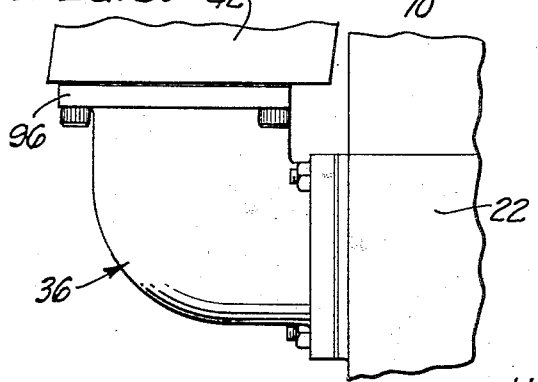
FIG. 5 is a side elevational view of an alternative air intake manifold of the invention.

FIG. 5 of the drawings illustrates a modification wherein the filter 42 is bolted directly to the upper end of the intake manifold 36, the Y-shaped adapter 92 being omitted.

Referring to FIG. 4 of the drawings, the branch inlet portions 86 and 88 of the intake passage 76 in the manifold 36, and the branch outlet portions 72 and 74 of the intake passage 68 in the head 22, are arranged in a generally X-shaped pattern. Consequently, the combustion air flowing from the intake manifold 36 into the cylinder 56 comes primarily from the branch inlet portion 88 of the intake passage 76 in the manifold, as indicated by the arrow 112. Conversely, the combustion air flowing into the cylinder 58 comes primarily from the branch inlet portion 86 of the intake passage 76 in the intake manifold 36, as indicated by the arrow 114. Thus, there are two crossed flow paths through the intake passages 76 and 68 in the intake manifold 36 and the head 22, respectively. (Since the cylinders 56 and 58 are separated in the firing order of the engine 20, the combustion air flows along the paths represented by the arrows 112 and 114 occur at different times.)

The foregoing pattern of combustion flows to the cylinders 56 and 58 results in minimum flow losses. Measurements made with the air intake system 34 of the invention installed on the Cummins NH–250 diesel engine mentioned show that the vacuum in the intake passage 76 in the intake manifold 36 never is much above three inches of water, even at maximum engine speed. The result is materially improved engine efficiency, as reflected by increased power output and decreased fuel consumption. Additionally, the engine 20 operates more smoothly at all speeds, including idling.

Another important feature of the crossed flow pattern represented by the arrows 112 and 114 is that the combustion air approaches each pair of intake valves diagonally, instead of along a path more nearly perpendicular to the axis of the engine. Consequently, the respective air flows impinge directly on the rear valves 62 and 66, at least partially, to cause the rear valves to run cooler, thereby prolonging their lives. As will be apparent from FIG. 4 of the drawings, a substantial portion of the air flowing diagonally along the path 112 impinges directly on the rear valve 62, and a substantial portion of the air flowing along the path 114 impinges directly on the rear valve 66. This results in the cooler operation mentioned.

Although the combustion air delivered to the cylinder 56 comes primarily from the branch inlet portion 88 of the intake passage 76, and the air delivered to the cylinder 58 comes primarily from the branch inlet portion 85 of this intake passage, not all of the combustion air flows reaching the cylinders 56 and 58 come from the respective sources mentioned, due to the fact that the partition 90 does not completely separate the branch inlet portions 86 and 88 from each other. This is advantageous since it makes more air available to each of the cylinders 56 and 58 during the intake stroke of its piston, thereby further reducing intake flow losses.

The reduction in flow losses achieved by the air intake system 34 of the invention is augmented by the reduction in flow losses achieved by the exhaust system 46 of the invention, thereby further improving engine efficiency. Considering the exhaust system 46 in more detail, the exhaust manifolds 48, 50 and 52, and their relationships to the cylinder heads 22, 24 and 26, are identical. Consequently, only the exhaust manifold 48 will be considered in detail.

Referring particularly to FIGS. 7 to 9 of the drawings, the exhaust manifold 48 is a bifurcated manifold having inlet arms 122 and 124 respectively communicating with exhaust passages in the head 22 for the cylinders 56 and 58, the exhaust passage for the cylinder 58 being visible in FIG. 8 of the drawings and being designated by the reference numeral 126. The two inlet arms 122 and 124 merge downwardly and rearwardly, relative to the engine 20, into a common outlet portion 128. The outlet portions of the three exhaust manifolds 48, 50 and 52 are connected to the muffler system 54, which will be described hereinafter.

The two arms 122 and 124 of the exhaust manifold 48 are connected to the head 22, in communication with the corresponding exhaust passages in the head, in the same manner. Consequently, only the connections of the arm 124 to the head 22 will be considered in detail.

As shown in FIGS. 7 to 9, threaded into the exhaust side of the head 22 on opposite sides of the exhaust passage 126 are studs 130. The arm 124 of the exhaust manifold 48 is formed with a flanged end seated against the side of the head 22 around the exhaust passage 126, such flanged end providing opposed lugs 132 having therein opposed notches 134 which face away from each other in the direction of the axis of the engine 20 and which receive the respective studs 130 therein. The lugs 132 have outer surfaces 136 spaced outwardly from the exhaust side of the head 22 and converging toward the exhaust side of the head, as best shown in FIG. 8. Seated on the outer surfaces 136 of the lugs 132 are washers 138. These washers have inner surfaces 140 which also converge toward the exhaust side of the head 22 and which are respectively complementary to the convergent outer surfaces 136 of the lugs 132. As shown in FIG. 7, the washers 138 may be rectangular so that the exhaust-manifold arm 124 maintains the desired orientation of the inner surfaces 140 of the washers relative to the outer surfaces 136 of the lugs. The washers 138 have openings therethrough for the studs 130 and have outer surfaces perpendicular to the axes of the studs and engageable by lock washers 142 under nuts 144 threaded on the outer ends of the studs.

The convergent outer surfaces 136 on the lugs 132 and the convergent inner surfaces 140 on the washers 138 can slide relative to each other to compensate for relative expansion and contraction of the exhaust manifold 48 and the head 22. At the same time, the convergence of the surfaces constantly biases the exhaust-manifold arm 124 into a central position in register with the exhaust passage 126. With this construction, complete freedom of movement to compensate for relative expansion and contraction is provided without any danger of breakage of the parts involved, which is an important feature of the invention.

Turning to FIG. 6 of the drawings for a consideration of the muffler system 54, connected to the outlet portions of the exhaust manifolds 48, 50 and 52 are exhaust pipes 148, 150 and 152 respectively connected to separate, resonator-type mufflers 154, 156 and 158 by ball-and-socket joints 160, 162 and 164. These joints are broken when the cab 32 of the truck 28 is tilted upwardly and forwardly for access to the engine 20, and are made automatically when the cab is restored to its operating position. (Although the ball-and-socket joints 160, 162 and 164 are shown arranged in a row in FIG. 6, it will be understood that, in actual practice, they may be arranged in a cluster to save space, the same being true of the mufflers 154, 156 and 158.)

The mufflers 154, 156 and 158 are identical so that only the muffler 156 will be described in detail. It is a typical resonator-type muffler, comprising concentric inner and outer pipes 166 and 168, the portion of the inner pipe 166 within the outer pipe 168 being perforated. The upper ends of the inner pipes of the three mufflers 154, 156 and 158 lead to a common exhaust stack 170 to reduce the exhaust noise level which would result from three separate stacks.

The foregoing exhaust system 46 and muffler system 54 result in a very low back pressure on the engine 20, the back pressure in each exhaust manifold 48, 50 and 52 being of the order of one inch of water, or less. This effects a marked improvement in engine efficiency, and also results in a considerably cooler exhaust, with a consequent reduction in lubricating oil temperature, all of which are important features of the invention.

The air intake and exhaust and muffler systems of the invention cooperate to achieve striking improvements in the performance of the engine 20. When the intake, exhaust and muffler systems of the invention were installed on a truck equipped with a Cummins NH–250 diesel engine, the maximum intake vacuum was reduced to slightly over three inches of water, the maximum exhaust back pressure was reduced to approximately one inch of water, the maximum horsepower output of the engine was increased approximately 14%, the over-all fuel mileage for a typical long-distance interurban truck run was increased approximately 10%, the maximum exhaust temperature under peak torque loads was reduced approximately 200° F., the maximum lubricating oil temperature was reduced approximately 20° F., and the like. In addition to the foregoing, the engine ran considerably more smoothly, at both idling and operating speeds, than the same engine with a common intake manifold and a common exhaust manifold serving all cylinders.

Although exemplary embodiments of the invention have been disclosed herein for purposes of illustration, it will be understood that various changes, modifications and substitutions may be incorporated in such embodiments without departing from the spirit of the invention as defined by the claims appearing in the next section hereof.

I claim as my invention:

1. In combination:
   (a) an internal combustion engine having pairs of adjacent cylinders each pair of which is provided with intake and exhaust passages;
   (b) separate intake manifolds respectively communicating with said intake passages of said pairs of cylinders;
   (c) separate exhaust manifolds respectively communicating with said exhaust passages of said pairs of cylinders;
   (d) each of said pairs of cylinders being provided with a Y-shaped intake passage which includes a common inlet portion terminating in branch outlet portions respectively leading to and communicating with said cylinders of such pair;
   (e) each of said intake manifolds being provided with a Y-shaped intake-manifold passage which includes branch inlet portions merging into a common outlet portion communicating with said inlet portion of the corresponding intake passage; and
   (f) said branch outlet portions of each of said intake passages and said branch inlet portions of the corresponding intake-manifold passage being arranged in a generally X-shaped pattern.

2. The combination set forth in claim 1 wherein said cylinders are fired in a predetermined order and wherein said cylinders of each of said pairs are separated in the firing order to provide time for the exhaust from one cylinder of each pair to pass through the corresponding exhaust manifold before the exhaust from the other cylinder of such pair enters such exhaust manifold.

3. In combination:
   (a) an internal combustion engine including at least one pair of adjacent cylinders;
   (b) said pair of cylinders being provided with a Y-shaped intake passage which includes a common inlet portion terminating in branch outlet portions respectively leading to and communicating with said cylinders;
   (c) an intake manifold connected to said pair of cylinders and provided with a Y-shaped intake-manifold passage which includes branch inlet portions merging into a common outlet portion communicating with said inlet portion of said intake passage; and
   (d) said branch outlet portions of said intake passage and said branch inlet portions of said intake-manifold passage being arranged in a generally X-shaped pattern.

4. The combination set forth in claim 3 wherein said outlet portion of said intake-manifold passage is generally horizontal and wherein said branch inlet portions of said intake-manifold passage are generally vertical and merge downwardly into said outlet portion of said intake-manifold passage.

5. The combination set forth in claim 4 including:
   (a) exhaust passages in said pair of cylinders and respectively communicating with said cylinders; and
   (b) an exhaust manifold connected to said pair of cylinders and provided with a bifurcated exhaust-manifold passage having branch inlet portions respectively communicating with said exhaust passages and having a common outlet portion communicating with said branch inlet portions thereof.

6. The combination set forth in claim 1 including separate separate mufflers respectively connected to said exhaust manifolds.

References Cited

UNITED STATES PATENTS

| Re. 19,742 | 10/1935 | Treiber | 123—32 |
| 1,196,382 | 8/1916 | Moore | 60—29 |
| 1,598,891 | 9/1926 | Stokes | 123—59 |
| 1,933,380 | 10/1933 | Mock | 123—52 |
| 2,192,730 | 3/1940 | Ellor | 60—29 |
| 3,274,981 | 9/1966 | Peras | 123—191 |

FOREIGN PATENTS

| 989,818 | 5/1951 | France. |
| 1,078,601 | 5/1954 | France. |

WENDELL E. BURNS, *Primary Examiner.*